UNITED STATES PATENT OFFICE 2,522,670

REACTION OF DIALKENYL KETONES WITH TERTIARY ALKYL MERCAPTANS

Frederick C. Frank, Ardmore, Pa., assignor to Socony-Vacuum Oil Company, Incorporated, a corporation of New York No Drawing. Application July 30, 1947, Serial No. 764,911

2 Claims. (Cl. 260—593)

This invention relates to a method of producing certain new reaction products, the reaction products themselves, mixtures of the reaction products with lubricating oil compositions, and the lubrication of relatively moving surfaces by the use of compositions containing, as an essential ingredient, the new reaction products. More specifically, this invention relates to products formed by reacting oleone (diheptadecenyl ketone) with tertiary butyl mercaptan, to form a synthetic lubricant or a blending agent.

Prior to this invention, a great many thioethers have been prepared and some of these have been suggested for use in lubricating oils, in minor proportions, for the purpose of stabilizing the oils. Insofar as is known, however, no product of the type herein described has been prepared, and no such product has been heretofore used as a synthetic lubricant or a blending agent.

In accordance with the present invention, it has been discovered that tertiary butyl mercaptan can be caused to react with oleone, either in the presence or absence of a catalyst, to yield a sulfur-containing product having a good viscosity index, good pour point response, good oxidation stability and, in general, all of the attributes of a good synthetic lubricating oil or a synthetic blending stock.

While the invention will be described as applied particularly to a reaction product of tertiary butyl mercaptan and oleone (diheptadecenyl ketone), in a somewhat broader aspect, the invention includes also products prepared from tertiary alkyl mercaptans ranging from tertiary butyl mercaptan to tertiary octyl mercaptan and higher tertiary aliphatic mercaptans, and from dialkenyl ketones ranging from didecenyl ketone to ditetracosenyl ketone. Furthermore, the alkenyl radicals of the ketones may contain different numbers of carbon atoms as, for example, in heptadecenyldodecenyl ketone. Still further, a mixture of tertiary mercaptans, or a mixture of ketones, may be used instead of a single mercaptan or ketone.

Apparently, the mercaptan attaches itself at the double bonds of the ketone forming a thioether linkage at that point. The ketone linkage itself appears to be unaffected.

The reaction is preferably accomplished by mixing the ketone with an excess of tertiary aliphatic mercaptan and subjecting the mixture to an elevated temperature under pressure sufficient to maintain the reactants in a liquid state and for a period of time sufficient to insure completion of the reaction. The use of a catalyst is optional. Temperatures of the order of 400° F. have been found preferable and temperatures of 300° F. to 500° F. are definitely satisfactory. The reaction is generally complete within eight hours.

It is preferable to have an excess of tertiary aliphatic mercaptan present, and this excess may range from 25% to 300%. Preferably, however, the excess will be in the neighborhood of 100%, say 100% plus or minus 25%.

Upon completion of the reaction, the excess of tertiary aliphatic mercaptan may be removed by any known process and the reaction product further purified, if desired, by fractional distillation, solvent extraction, dewaxing, or any of the other known processes for purifying reaction products in general, or lubricating oils in particular.

Further details and advantages of this invention will be apparent from the following examples and results of tests.

EXAMPLE I 251 grams (0.5 mol) of oleone (diheptadecenyl ketone) was reacted with 180 grams (2 mols) of tertiary butyl mercaptan (100% excess) at 400° F., for 8 hours, in a 2 liter shaker autoclave. The reaction product was diluted with toluene and filtered by suction through a layer of absorptive clay. The filtrate was filtered again by gravity into a distilling flask and topped to 200° C. pot temperature, first using the plant vacuum, then with the vacuum pump at 5–6 mm. The distillate from the vacuum pump distillation was nil. The residue in the flask amounted to 226 grams. The yield was 66.5% of the theoretical. The oil had the following properties before and after dewaxing at −20° F.

TABLE I

|  | Before Dewaxing | After Dewaxing |
|---|---|---|
| Gravity, API | 25.2 | 24.8 |
| Pour, °F | 85 | 35 |
| Kinematic Viscosity at 100° F | 98.3 | 120.9 |
| Kinematic Viscosity at 210° F | 14.50 | 16.39 |
| Viscosity Index | 136 | 132 |
| Sulfur Analysis, Per Cent Found | 5.33 | 5.6 |

Since the viscosity of this oil is high when compared with the usual SAE grades of lubricating oils, the dewaxed synthetic oil was blended with a light mineral oil base. The physical data on these blends is shown in the following table.

TABLE II

| Oil or Blend | Pour, °F. | KV at 100° F. | KV at 210° F. | Viscosity Index |
|---|---|---|---|---|
| Base oil alone | 25 | 27.64 | 4.88 | 110 |
| 10% Synthetic Oil+90% Base oil | 25 | 32.26 | 5.64 | 125 |
| 25% Synthetic Oil+75% Base oil | 20 | 40.16 | 6.72 | 129 |
| 50% Synthetic Oil+50% Base oil | 25 | 58.20 | 9.00 | 131 |
| 90% Synthetic Oil+10% Base oil | 40 | 106.3 | 14.67 | 132 |
| 100% Synthetic Oil | 35 | 120.9 | 16.39 | 132 |

It is of interest to note that although the pour point of the synthetic oil is higher than that of the base oil, blending the two does not raise the pour point of the mineral oil, except at very high concentrations, e. g., (90%). However, there is considerable improvement in the viscosity index of the base oil at all concentrations.

Some of the above blends were treated with a wax-substituted phenol type of pour depressant to determine their pour point response. The results are given in the following table.

TABLE III

| Oil or Blend | Percent Pour Point Depressant | Pour, °F. | KV at 100° F. | KV at 210° F. | Viscosity Index |
|---|---|---|---|---|---|
| Base oil | 0.375 | −15 | 28.34 | 4.98 | 112 |
| 10% Synthetic Oil +90% Base oil | 0.375 | −25 | 33.13 | 5.67 | 121 |
| 25% Synthetic Oil +75% Base oil | 0.375 | −10 | 41.26 | 6.78 | 127 |

EXAMPLE II

In order to determine the effect of a catalyst on the addition of tertiary butyl mercaptan to the double bonds of oleone, the following run was performed, which is identical with the preceding example except for the use of a catalyst.

251 grams (0.5 mol) of oleone were reacted with 180 grams (2 mols) of tertiary butyl mercaptan (100% excess) using 43 grams of phosphoric acid impregnated pelleted synthetic silica-alumina cracking catalyst comprising about 88% $SiO_2$ and 12% $Al_2O_3$ on a dry basis, in the reaction mixture. The amount of catalyst employed was 10% of the total weight of the reactants. The reaction was carried out in a 2 liter shaker autoclave at 400° F. The reaction time was 8 hours.

The results of Examples I and II are compared in the following table.

TABLE IV

|  | No Catalyst | Catalyst |
|---|---|---|
| Gravity, API | 25.2 | 28.0 |
| Pour, °F | 85 | 75 |
| Kinematic Viscosity at 100° F | 98.3 | 93.58 |
| Kinematic Viscosity at 210° F | 14.50 | 14.54 |
| Viscosity Index | 136 | 139 |
| Sulfur Analysis, Percent Found | 5.33 | 3.1 |

The above table shows that there is some improvement in both the pour point and the viscosity index when the catalyst is used. The sulfur content is lower, however, when the catalyst is employed.

The product obtained using the catalyst was dewaxed at −20° F. by the usual dewaxing method. The dewaxed sample of the synthetic oil alone, and blended with the above mentioned base oil, was tested by a Rotating Cylinder Oxidation Test. This test is conducted in a reaction chamber consisting of a 9½ inch section of standard 5-inch iron pipe. Each end is closed with a flat steel plate, one end being equipped with a thermometer well and a 1/16 inch inside air vent. The cylinder is rotated about a horizontal axis at 20 R. P. M. so that the sample wets the entire curved surface. The cylinder is enclosed is an insulated box, and electrically heated.

25 cc. of the test oil is placed in the clean, sandblasted cylinder. The vessel in started rotating with the heater adjusted to maintain the temperature in the reaction chamber at 300° F. After 72 hours the cylinder is allowed to cool to room temperature. The test oil is then removed from the apparatus and tested for kinematic viscosity at 100° F., kinematic viscosity at 210° F., neutralization number and ASTM naphtha insolubles. The surfaces of the cylinder are examined for abnormal sludge or lacquer deposits after the completion of the test. The results of this test are given in Table V.

TABLE V

*Before rotating cylinder oxidation test*

| Synthetic Oil or Blend | Gravity, API | Pour, °F. | Kinematic 100° F. | Viscosity 210° F. | V. I. |
|---|---|---|---|---|---|
| Base oil |  | 25 | 27.64 | 4.88 | 110 |
| Base oil containing 0.375% pour depressant | 32.8 | −20 | 28.32 | 4.98 | 112.0 |
| Base oil containing 10% synthetic oil and 0.375% pour depressant | 31.7 | −25 | 33.13 | 5.67 | 121.4 |
| Base oil containing 25% synthetic oil and 0.375% pour depressant | 30.6 | −10 | 41.26 | 6.78 | 126.8 |
| Base oil containing 50% synthetic oil and 0.188% pour depressant |  | 25 | 58.33 | 9.06 | 131.5 |
| Synthetic oil only | 26.3 | 40 | 118.3 | 16.72 | 134.4 |

*After rotating cylinder oxidation test*

| Synthetic Oil or Blend | N. N. | ASTM Naphtha Insol. % | Kinematic 100° F. | Viscosity 210° F. | V. I. |
|---|---|---|---|---|---|
| Base oil containing 0.375% pour depressant | 3.0 | 2.2 | 35.22 | 5.73 | 113.2 |
| Base oil containing 10% synthetic oil and 0.375% pour depressant | 2.1 | 0.23 | 41.7 | 6.59 | 119.3 |
| Base oil containing 25% synthetic oil and 0.375% pour depressant | 2.6 | 0.12 | 57.2 | 8.63 | 127.0 |
| Base oil containing 50% synthetic oil and 0.188% pour depressant | 2.7 | 0.08 | 108.3 | 14.11 | 126.8 |
| Synthetic oil only | 2.5 | 0.13 | 84.54 | 11.83 | 128.6 |

The synthetic oil was in each case prepared in accordance with Example II, that is, by the use of a catalyst and was, in each case, dewaxed prior to blending and testing. The pour point depressant mentioned in the above table and elsewhere in the specification was a commercial pour point depressant concentrate of the wax substituted phenol type, sold under the name of "Santopour-B," a trade-name of the Monsanto Chemical Company.

The results of the above tests clearly indicate the synthetic oils produced in accordance with this invention to be highly useful for the lubrication of relatively moving surfaces by the maintenance between said surfaces of a film comprised essentially of the new products. It will be immediately apparent from the above table that as little as 10% of the new synthetic oils, added to known lubricating oils, produces a beneficial effect and that the new synthetic oils can be desirably used in concentrations up to 100%. It has also been found that they are subject to improvement in other respects by the addition of other improving agents normally added to mineral lubricating oils.

What is claimed is:

1. A chemical reaction product formed by the interaction of a dialkenyl ketone in which the alkenyl radicals contain between 10 and 24 carbon atoms per radical, with a molar excess of a tertiary alkyl mercaptan containing between about 4 carbon atoms and about eight carbon atoms per molecule, at a temperature of 300° F. to 500 F.

2. A reaction product formed by the interaction of diheptadecenyl ketone with a molar excess of tertiary butyl mercaptan, at a temperature of 300° F. to 500° F.

FREDERICK C. FRANK.

REFERENCES CITED

The following references are of record in the file of this patent:

UNITED STATES PATENTS

| Number | Name | Date |
| --- | --- | --- |
| 2,322,093 | Moran | June 15, 1943 |
| 2,327,966 | Morey | Aug. 24, 1943 |
| 2,419,586 | Otto | Apr. 29, 1947 |

OTHER REFERENCES

Houben: "Die Methoden der Organischen Chemie," 3rd edition, vol. 2 (1925), Edwards Bros., Inc., Ann Arbor, Michigan, pages 1008–1009.

Schonberg et al., Berichte, vol. 60B, pages 2344–2351 (1927).

Recsei, Berichte, vol. 60B, pages 1836–1840 (1927).

Ipatieff et al., J. Am. Chem. Soc., vol. 61, pages 71–74 (1939).

Jones et al., J. Am. Chem. Soc., vol. 60, pages 2452–2455 (1938).